United States Patent
Karlsson (10) Patent No.: US 9,427,747 B2
(45) Date of Patent: Aug. 30, 2016

(54) CENTRIFUGAL SEPARATOR WITH LAMELLA COUPLING

(75) Inventor: Per Karlsson, Hägersten (SE)

(73) Assignee: Alfa Laval Corporate AB, Lund (SE)

( * ) Notice: Subject to any disclaimer, the term of this patent is extended or adjusted under 35 U.S.C. 154(b) by 1263 days.

(21) Appl. No.: 12/990,802

(22) PCT Filed: May 11, 2009

(86) PCT No.: PCT/SE2009/050523
§ 371 (c)(1),
(2), (4) Date: Dec. 9, 2010

(87) PCT Pub. No.: WO2009/139706
PCT Pub. Date: Nov. 19, 2009

(65) Prior Publication Data
US 2011/0124481 A1    May 26, 2011

(30) Foreign Application Priority Data
May 13, 2008  (SE) ...................................... 0801076

(51) Int. Cl.
*B04B 9/04* (2006.01)
*B04B 9/12* (2006.01)
(Continued)

(52) U.S. Cl.
CPC . *B04B 9/12* (2013.01); *B04B 9/04* (2013.01); *F16D 3/06* (2013.01); *F16D 3/79* (2013.01)

(58) Field of Classification Search
CPC .................................. B04B 9/04; B04B 9/12
USPC ........................... 494/43, 46, 67–73, 82–84; 464/179–180; 384/108, 498, 438, 440
See application file for complete search history.

(56) References Cited

U.S. PATENT DOCUMENTS 2,534,738 A * 12/1950 Scott ............................. 384/196
3,724,238 A    4/1973 Billot et al.
(Continued)

FOREIGN PATENT DOCUMENTS

CA    2448257 C    12/2002
DE     549253 C     4/1932
(Continued)

OTHER PUBLICATIONS

Decision on Grant for Russian Application No. 2010150736/5(073283), dated Dec. 10, 2012.
(Continued)

*Primary Examiner* — Charles Cooley
(74) *Attorney, Agent, or Firm* — MKG, LLC (57) ABSTRACT

A centrifugal separator comprises a frame, a spindle and centrifuge rotor on the spindle. The centrifuge rotor comprises a rotor casing, which forms an inner separation space, an inlet for supply of a fluid and an outlet for discharge of a separated component. An electrical drive motor having a stator and a rotor drives the spindle and the centrifuge rotor. The rotor of the drive motor is supported by a first bearing and second bearing. A coupling member connects the rotor of the drive motor and the spindle for transmitting a rotary movement. A third bearing supports the spindle so that it is radially elastic in relation to the frame for transmitting a first part of radial forces between the spindle and the frame. The coupling member comprises a lamella coupling or a universal coupling, and transmits a second part of the radial forces, which exists between the spindle and the frame, to the frame via the rotor of the drive motor and at least one of the first and the second bearing.

13 Claims, 5 Drawing Sheets

(51) Int. Cl.
  *F16D 3/06* (2006.01)
  *F16D 3/79* (2006.01)

(56) References Cited

U.S. PATENT DOCUMENTS

| | | | | |
|---|---|---|---|---|
| 3,814,306 | A * | 6/1974 | Wutz et al. | 494/1 |
| 4,568,324 | A * | 2/1986 | Williams | 494/82 |
| 4,846,773 | A * | 7/1989 | Giebeler et al. | 474/82 |
| 4,946,433 | A * | 8/1990 | Gorodissky et al. | 494/15 |
| 5,342,282 | A | 8/1994 | Letourneur | |
| 5,827,168 | A | 10/1998 | Howell | |
| 6,960,158 | B2 * | 11/2005 | Mackel | 494/82 |
| 7,090,634 | B2 * | 8/2006 | Mackel et al. | 494/15 |
| 8,182,408 | B2 * | 5/2012 | Isaksson et al. | 494/70 |
| 9,079,193 | B2 * | 7/2015 | Klintenstedt | B04B 9/04 |
| 9,197,112 | B2 * | 11/2015 | Stallinger | H02K 11/00 |
| 2004/0142808 | A1 * | 7/2004 | Mackel | 494/82 |
| 2004/0192532 | A1 * | 9/2004 | Mackel et al. | 494/15 |
| 2009/0186752 | A1 * | 7/2009 | Isaksson et al. | 494/40 |
| 2011/0124481 | A1 * | 5/2011 | Karlsson | 494/83 |
| 2015/0141231 | A1 * | 5/2015 | Strauch et al. | 494/15 |
| 2015/0283561 | A1 * | 10/2015 | Mackel | B04B 9/04 494/10 |

FOREIGN PATENT DOCUMENTS

| | | |
|---|---|---|
| DE | 8100241 U1 | 11/1982 |
| DE | 3714627 A1 | 11/1987 |
| DE | 19516904 A1 | 11/1996 |
| EP | 1117485 A1 | 7/2001 |
| EP | 1392446 A1 | 3/2004 |
| GB | 251593 A | 8/1926 |
| GB | 331323 A | 7/1930 |
| GB | 371303 | 4/1932 |
| GB | 371303 A | 4/1932 |
| GB | 721226 A | 1/1955 |
| GB | 778862 A | 7/1957 |
| GB | 2159240 A | 11/1985 |
| SU | 721124 A1 | 3/1980 |
| SU | 806130 A2 | 2/1981 |
| SU | 1194504 A | 11/1985 |
| WO | 0108807 A1 | 2/2001 |
| WO | 2007133161 A1 | 11/2007 |

OTHER PUBLICATIONS

Office Action in corresponding Canadian Patent Application No. 2723625, dated Mar. 7, 2016, pp. 1-4.

* cited by examiner

CENTRIFUGAL SEPARATOR WITH LAMELLA COUPLING

FIELD OF THE INVENTION

The present invention refers to a centrifugal separator.

BACKGROUND OF THE INVENTION

Centrifugal separators have a drive motor which can be provided in various ways in relation to the centrifuge rotor. According to a common variant, the drive motor is located beside the spindle of the centrifuge rotor. The power transmission from the drive motor to the spindle can then be obtained by means of a drive belt, wherein the axis of rotation of the drive motor is parallel to the spindle, or by means of a gear box, wherein the axis of rotation of the drive motor may be perpendicular to the spindle. A disadvantage of these known solutions is energy losses in the power transmission. Furthermore, the components included in the power transmission, especially the drive belt and the gear box, are subjected to wear.

According to another variant, the rotor shaft of the drive motor and the spindle are provided after each other along a common axis. The spindle is then directly connected to the rotor shaft of the drive motor via a coupling, and thus without any power transmission in the form of a drive belt or a gear box. The spindle is supported by two bearings, a first upper spindle bearing and a second lower spindle bearing. The two spindle bearings thus absorb both axial and radial forces. The drive motor is provided below the lower spindle bearing, wherein the rotor shaft of the drive motor is connected to the spindle via a coupling. Such a centrifugal separator is disclosed in DE-A-3714627. A disadvantage of this known solution is that the total height of the centrifugal separator is high.

GB-A-251,593 discloses a similar centrifugal separator, wherein the upper spindle bearing and the lower spindle bearing have been provided in the proximity of each other in a common bearing unit arranged to absorb axial and radial forces.

EP-B-1 392 446 disclosed another similar centrifugal separator where the upper spindle bearing and the lower spindle bearing have been provided in a common bearing unit for absorbing axial and radial forces.

A disadvantage of these two solutions is that the bearing units are complicated. The bearing units shall, except for absorbing axial and radial forces, also permit the spindle to pivot.

SUMMARY OF THE INVENTION

The present invention resides in one aspect in a coupling member that comprises one of a lamella coupling and universal coupling, and is arranged to transmit a second part of the radial forces, which during operation exist between the spindle and the frame, to the frame via the rotor and at least one of the first bearing and the second bearing.

By means of such a coupling member, enabling directed drift with low transmission losses, a part of the radial forces, existing during operation, can be transmitted to the frame by means of the coupling member proper. Advantageously, the coupling member is also arranged to permit inclination of the spindle in relation to the centre axis. This means that the coupling member is configured to form a pivot point about which the spindle may pivot. Furthermore, the coupling member is advantageously arranged to centre a lower end of the spindle. This means that the coupling member is configured in such a way that the spindle is centered at the level of the coupling member and more precisely at the level of, or substantially at the level of, the pivot point.

According to an embodiment of the invention, the coupling member comprises a first coupling element, which is connected to the rotor of the drive motor, and second coupling element, which is connected to the spindle. According to a first variant the coupling member comprises a lamella coupling having a coupling disc provided between and in torque-transmitting engagement with the first coupling element and the second coupling element. With such a coupling member, the three functions mentioned above, namely absorbing radial forces, inclination of the spindle and centering of the spindle in the area of the coupling member, are enabled. According to a second variant, the coupling member comprises a universal coupling having an intermediate coupling element, which via at least a first pivot pin is provided in torque-transmitting engagement with the first coupling element and via at least a second pivot pin is provided in torque-transmitting engagement with the second coupling element, wherein the first pivot pin and the second pivot pin extend perpendicularly to each other. Also such a universal coupling enables the three functions mentioned above, namely absorbing radial forces, inclination of the spindle and centering of the spindle in the area of the coupling member, and more precisely in a plane extending through the two pivot pins.

According to a further embodiment of the invention, the centrifugal separator is designed to permit transmission of axial forces, existing during operation, from the spindle to the frame in such a way that the coupling member is released from the axial forces.

According to a further embodiment of the invention, the axial forces are transmitted to the frame via the third bearing, which is designed to absorb both axial and radial forces. A third bearing is thus a combined axial and radial bearing. The third bearing has a set of roller elements provided along a circular path. The radial and axial forces are thus absorbed by means of this single set of roller elements.

According to another embodiment of the invention, the axial forces are transmitted from the spindle to the frame via the rotor of the drive motor bypassing the coupling member. Advantageously, the axial forces may be transmitted from the spindle to the frame also via at least one of the first bearing member and the second bearing member.

According to an embodiment of the invention, the centrifugal separator comprises a member transmitting axial forces, which is arranged to transmit the axial forces bypassing the coupling member. By means of such a member transmitting axial forces, the coupling member will thus be released from all, or substantially all, axial forces. The member transmitting axial forces may advantageously comprise an element which is provided in axial force-transmitting engagement with the spindle and with the rotor of the drive motor. Advantageously, the member transmitting axial forces may also comprise a connecting member, which is connected to the rotor of the drive motor, wherein the element is in force-transmitting engagement with the connecting member.

According to a further embodiment of the invention, the element is arranged to permit an inclination between the spindle and the frame. The element may advantageously be manufactured in an elastic material. Furthermore, the element may have an elongated, rod-like shape.

According to a further embodiment, the coupling disc has a central opening through which the element extends.

According to a further embodiment of the invention, the spindle and the rotor of the drive motor are provided axially after each other.

According to a further embodiment of the invention, the spindle extends through the rotor of the drive motor. In such a way a low height of the centrifugal separator is achieved.

BRIEF DESCRIPTION OF THE DRAWINGS

The present invention will now be explained more closely by means of a description of various embodiments, which are shown as non-limiting examples, and with reference to the drawings attached hereto.

DETAILED DESCRIPTION OF VARIOUS EMBODIMENTS OF THE INVENTION

Figure 1:
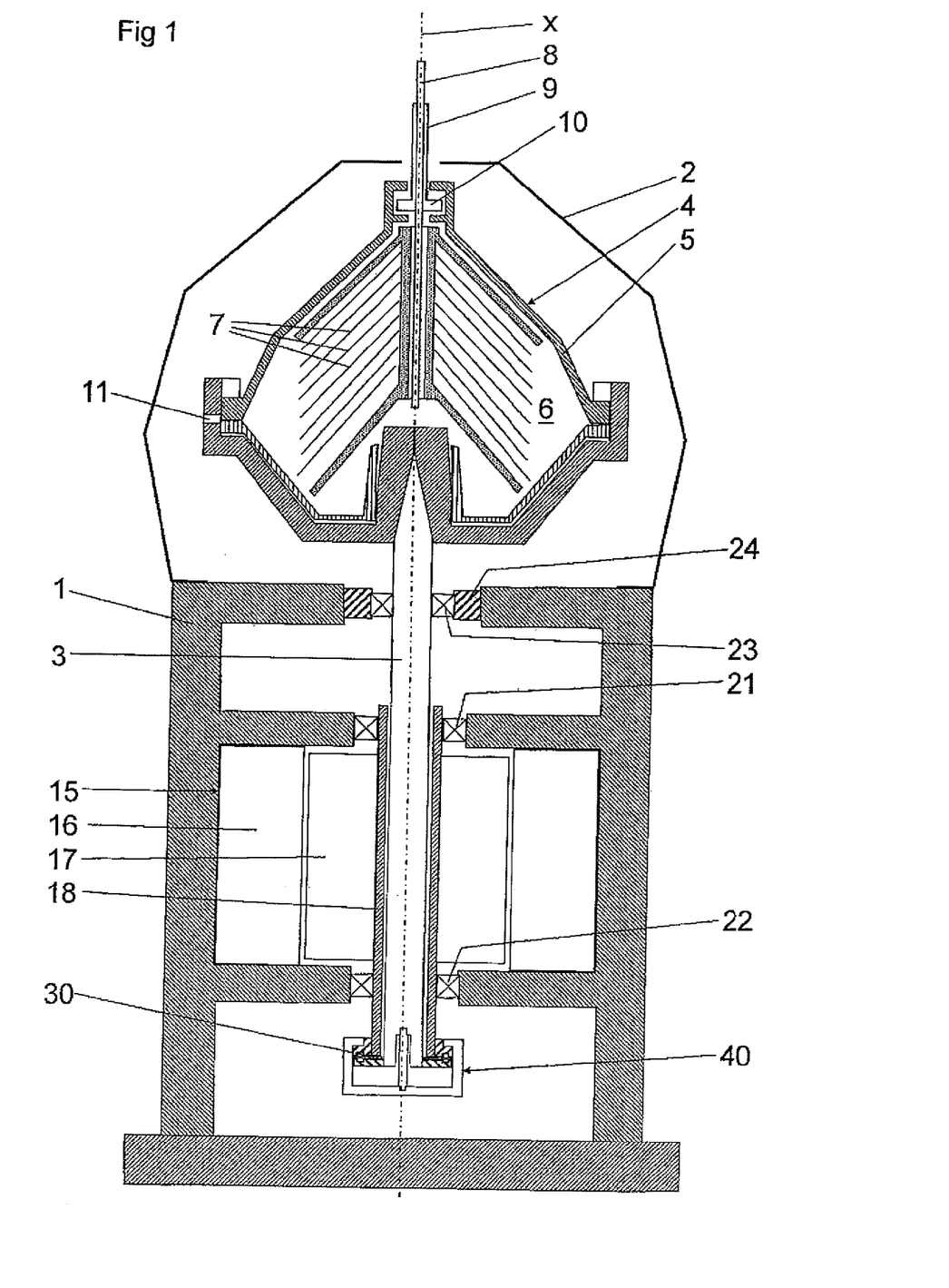
FIG. 1 discloses a sectional view through a centrifugal separator according to a first embodiment of the invention.

FIG. 1 discloses a centrifugal separator which is configured for separation of components included in a fluid, for instance a liquid or a gas, wherein the components comprises at least a first component having a first density and a second component having a second density. The centrifugal separator comprises a non-rotatable frame 1 and a non-rotatable casing 2. The centrifugal separator also comprises a rotatable spindle 3, which extends along a longitudinal axis and which carries a centrifuge rotor 4. The centrifuge rotor 4 is mounted on and rotates with the spindle 3. The centrifuge rotor 4 comprises a rotor casing 5, which encloses and forms an inner separation space 6 within itself. In the separation space 6 a set of separation discs 7 are provided in a manner known per se. An inlet 8 extends through the casing 2 and the rotor casing 5 into the separation space 6 for supply of the fluid to the separation space 6. An outlet 9 extends from a discharge member 10, for instance a so called paring disc, in the separation space 6 through the casing 2 and the rotor casing 5 for discharge of the first component which has been separated during operation of the centrifugal separator. The centrifuge rotor 4 comprises in the embodiment disclosed also a number of radial fixed nozzles or openable apertures 11 through the rotor casing 5 for discharge of the second component from the separation space 6.

The centrifugal separator also comprises an electrical drive motor 15, which comprises a stator 16 and a rotor 17. The drive motor 15 is arranged to drive the spindle 3 and thus the centrifuge rotor 4 so that these rotate at high rotary speed. The rotor 17 of the drive motor 15 comprises in the first embodiment a hollow rotor shaft 18, which is supported by a first bearing 21 and a second bearing 22 for rotation around a centre axis x. The first bearing 21 and the second bearing 22 are both supported directly by the frame 1 or by the stator 16. The first bearing 21 is provided at the upper end of the drive motor 15, which faces the centrifuge rotor. The first bearing 21 is in the first embodiment configured as a radial bearing for absorbing radial, or substantially radial, forces. The second bearing 22 is provided at the lower end of the drive motor 15 and is in the first embodiment configured as combined axial and radial bearing for absorbing both axial and radial forces.

A third bearing 23 is provided in and supported by the frame 1. The third bearing 23 supports the spindle 3 and is in the first embodiment configured as radial bearing for absorbing radial, or substantially radial, forces existing during the operation of the centrifugal separator. In the first embodiment, the third bearing 23 is elastically provided in the frame 1 by means of elastic elements 24 in such a way that the spindle 3 is radially elastic in relation to the frame 1 for transmitting a first part of the radial forces, existing during operation of the centrifugal separator, from the spindle 3 to the frame 1.

A coupling member 30 is provided between and connected to the rotor 17 of the drive motor 15 and the spindle 3 for transmitting a rotary movement of the rotor 17 of the drive motor 15 to the spindle 3. The coupling member 30 is arranged to transmit a second part of the radial forces, existing during operation of the centrifugal separator, from the spindle 3 to the frame 1 via the rotor 17 and the rotor shaft 18 of the drive motor 15 and via at least one of the first bearing 21 and the second bearing 22.

Figure 2:
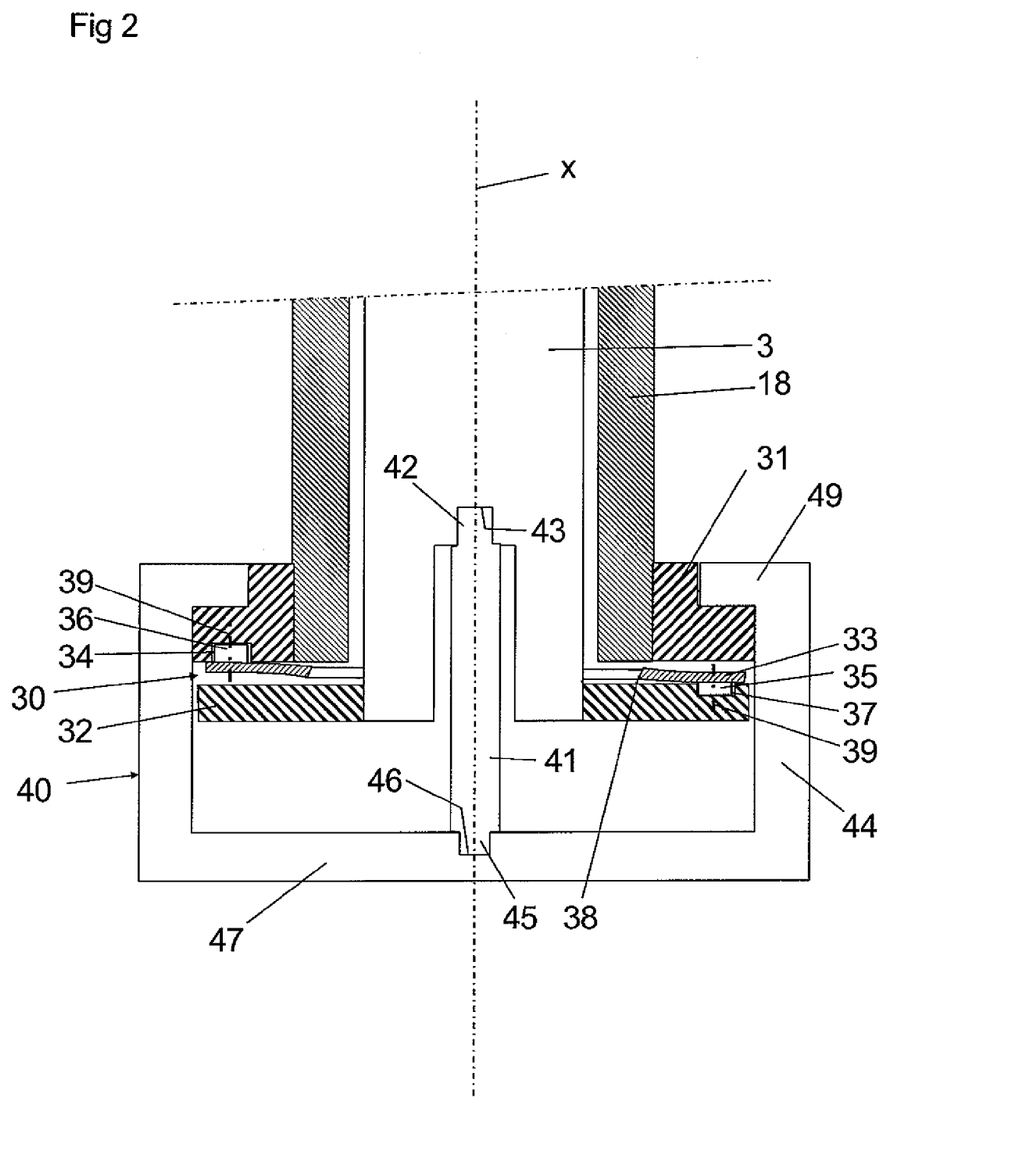
FIG. 2 discloses a sectional view through a first variant of a coupling member of the centrifugal separator in FIG. 1.

The coupling member 30 is arranged to permit inclination of the spindle 3 in relation to the centre axis x, i.e. the centre axis x of the rotor 17 may form an angle to the longitudinal axis of the spindle 3. Furthermore, the coupling member 30 is arranged to centre a lower end of the spindle 3. In order to achieve the inclination function and centering function, the coupling member 30 may according to a first variant be configured as or comprise a so called lamella coupling. The coupling member 30 comprises, as shown in FIG. 2, a first coupling element 31 which is fixedly connected to the rotor 17 of the drive motor 15, and more precisely to the rotor shaft 18, and a second coupling element 32 which is fixedly connected to the spindle 3. Furthermore, the coupling member 30 comprises a coupling disc 33 which is flexible and provided between the first coupling element 31 and the second coupling element 32. The coupling disc 33 is torque-transmittingly connected to the first coupling element 31 and the second coupling element 32, respectively, by means of suitable connections, for instance screw joints.

In the embodiment disclosed, the coupling disc 33 comprises, as an example, a number of first projections 34, which project from one side of the coupling disc 33, and an equal number of second projections 35, which project from the opposite side of the coupling disc 33. The first projections 34 are engaged in corresponding recesses 36 of the first coupling element 31. The second projections 35 are engaged in corresponding recesses 37 of the second coupling element 32. The first projections 34 are displaced in the peripheral direction in relation to the second projections 35. The first projections 34 are attached to the second coupling element 32 by means of schematically indicated screw joints 39. By means of the projections 34, 35 and the recesses 36, 37, a torque, or in other words a rotary movement can thus be transmitted from the rotor 17 and the rotor shaft 18 of the drive motor 15 to the spindle 3. Such a coupling member 30 transmits no, or substantially no, axial forces between the rotor 17 and the rotor shaft 18 of the drive motor 15, and the spindle 3. The coupling disc 33 has a central opening 38. The inclination about a pivot point is permitted through the flexibility of the coupling disc 33. The pivot point is located between the first coupling element 31 and the second coupling element 32.

In FIG. 2, two screw joints 39 are disclosed. It is to be noted, however, that the coupling member 33 advantageously comprises more screw joints 39 of the kind disclosed in FIG. 2 or suitable screw joints of another kind. The number of joints are equal and provided in an alternating order with respect to the connection with the first coupling element 31 and the second coupling element 32. The more such joints are comprised by their coupling member 30 the more rigid the coupling member 30 will be with respect to the inclination.

The centrifugal separator is thus configured to permit the transmission of the axial forces, arising during the operation of the centrifugal separator, from the spindle 3 to the frame 1 in such a way that the coupling member 30 is released from all, or substantially all, of these axial forces. In the first embodiment, the axial forces are transmitted from the spindle 3 to the frame 1 via the rotor 17 and the rotor shaft 18 of the drive motor 15 and via the second bearing 22, which is arranged to absorb axial forces.

As disclosed in FIGS. 1 and 2, the spindle 3 expends in the first embodiment through the rotor 17 of the drive motor 15 and through the hollow rotor shaft 18. The coupling member 30 is provided at the lower end of the spindle 3 and below the second bearing 22. The centrifugal separator also comprises a member 40 transmitting axial forces, which is arranged to transmit the above mentioned axial forces bypassing the coupling member 30. The member 40 transmitting axial forces comprises an element 41 which has an elongated, rod-like shape. The element 44 is provided in engagement with the spindle 3 to transmit axial forces. The element 41 has upper end 42 which is in engagement with a recess 43 in the spindle 3. The element 41 is also provided in engagement with the rotor 17 and the rotor shaft 18 of the drive motor 15 so that axial forces are transmitted via a connecting member 44 comprised by the member 40 transmitting axial forces and which can have a yoke-like design. The element 41 has a lower end 45, which is in engagement with a recess 46 of a lower part 47 of the connecting member 44. The connecting member 44 extends upwardly from the lower part 47 and is with an upper part 49 fixedly connected to the first coupling element 31 and/or the rotor 17 or the rotor shaft 18 of the drive motor 15.

As disclosed in FIGS. 1 and 2 the element 41 extends through the coupling member 30 and the central opening 38 of the coupling disc 33. The member 40 transmitting axial forces is arranged to permit inclination of the spindle 3 in relation to the frame 1. This can be achieved in that the element 41 is manufactured in an elastic material, for instance any suitable spring steel. This inclination may also be achieved through the connections between the element 41 and the spindle 3, and the connecting member 44, respectively. Consequently, the upper end 42 of the element 41 and the recesses 43 can be configured in such a way that the element 41 can be pivotably or fixedly attached in the recess 43. In the same way the lower end 45 of the element 41 can be configured so that the element 41 can be pivotably or fixedly attached in the recess 46. Such connections can be provided at one of the upper end 42 and the lower end 45 or at both these ends 42 and 45. The inclination may also be achieved in other ways, for instance in that the element 41 comprises some kind of elastic spring member.

Figure 3:
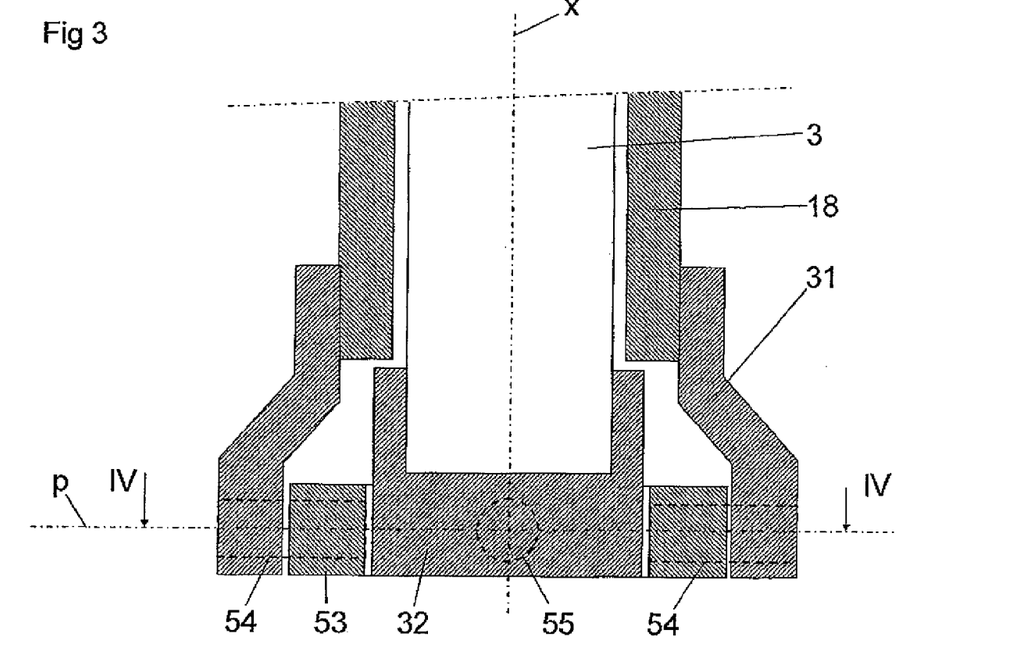
FIG. 3 discloses a sectional view through a second variant of a coupling member of the centrifugal separator in FIG. 1.
Figure 4:
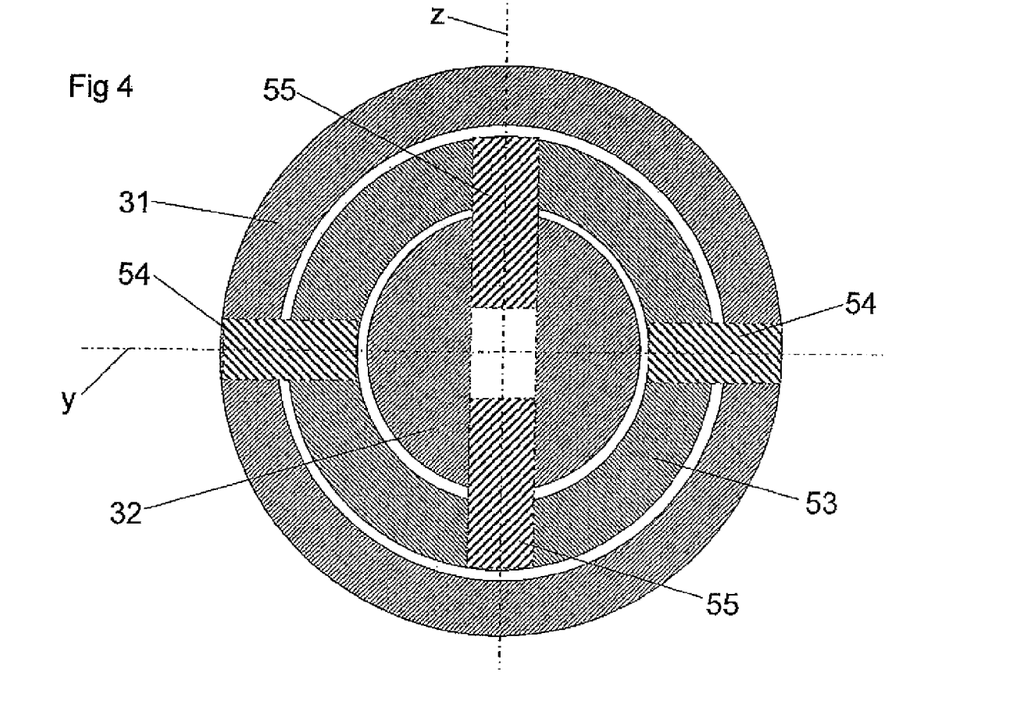
FIG. 4 discloses a sectional view along the line IV-IV in FIG. 3.

According to a second variant, the coupling member 30 may also be configured as or comprise a universal coupling. Also in this case, the coupling member, as disclosed in FIG. 3, comprises a first coupling element 31, which is fixedly connected to the rotor 17 of the drive motor 15, and more precisely to the rotor shaft 18, and a second coupling element 32, which is fixedly connected to the spindle 3. Furthermore, the coupling element 30 comprises an intermediate coupling element 53 which is configured as a ring. The coupling element 53 is via two first pivot pins 54 provided in torque-transmitting engagement with the first coupling element 31. The pivot pins 54 permits the coupling element 53 to pivot in relation to the first coupling element 31 about a pivot axis y which is substantially perpendicular to the centre axis x. The intermediate coupling element 53 is also via two second pivot pins provided in torque-transmitting engagement with the second coupling element 32. Thanks to the second pivot pins 55, the intermediate coupling element 53 may pivot in relation to the spindle 3 about a pivot axis z which is perpendicular to the pivot axis y and the centre axis x. The pivot axes x and z lie in the embodiment disclosed in a common plane p, which is substantially perpendicular to the centre axis x. Such a universal coupling may also transmit radial forces, which arise during operation, from the spindle 3 to the frame 1 via the rotor shaft 18 and one of the first bearing 21 and the second bearing 22. The universal coupling also permits inclination of the spindle 3 in relation to the rotor shaft 18 about a pivot point which is located in, or substantially in, the common plane p.

Figure 5:
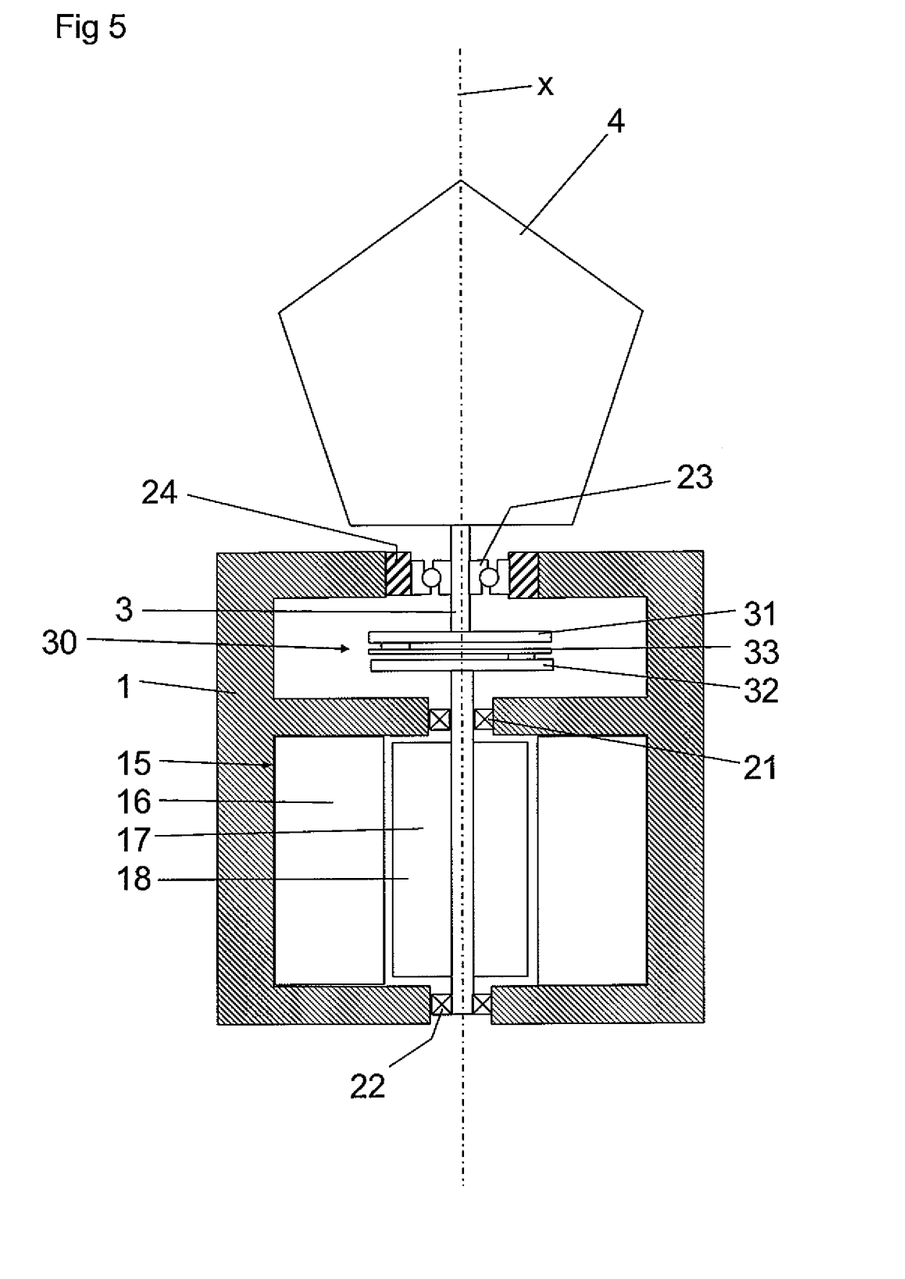
FIG. 5 discloses a simplified sectional view through a centrifugal separator according to a second embodiment of the invention.

FIG. 5 discloses a simplified illustration of a centrifugal separator according to a second embodiment. It is to be noted that elements and components having the same, or substantially the same, function have been provided with the same reference signs in all embodiments disclosed. The second embodiment differs from the first embodiment in that the spindle 3 does not extend through the rotor 17 of the drive motor 15 but the spindle 3 and the rotor 17 are provided axially after each other. The spindle 3 and the rotor 17 or rotor shaft 18 of the drive motor 15 are connected to each other via a coupling member 30, which has the same, or substantially the same, configuration as the coupling member disclosed in FIG. 3. In the second embodiment, the axial forces, which arise during operation of the centrifugal separator, are transmitted from the spindle 3 to the frame 1 via the third bearing 23. In the second embodiment the third bearing is configured to absorb both axial and radial forces arising during operation of the centrifugal separator. The third bearing 23 is a combination bearing i.e. an axial and radial bearing configured to absorb forces in substantially all directions. The third bearing comprises a set of roller elements provided along a circular path. Both axial and radial forces are absorbed by means of this single set of roller elements. It is also to be noted that also in the second embodiment, the third bearing 23 supports the spindle 3 in such a way that it is radially elastically provided in relation to the frame 1 by means of elastic elements 24.

Figure 6:
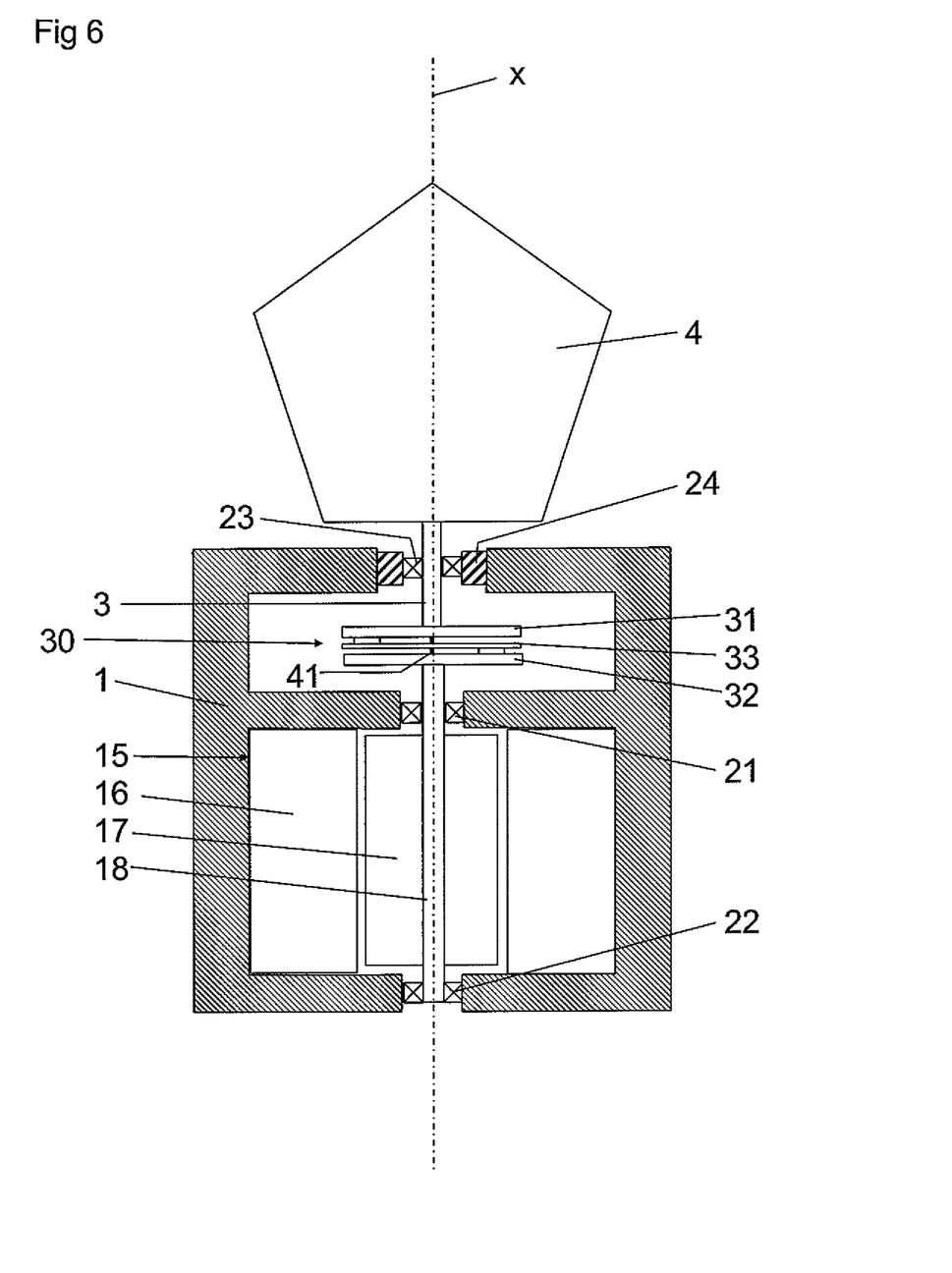
FIG. 6 discloses a simplified sectional view through a centrifugal separator according to a third embodiment of the invention.

FIG. 6 discloses a simplified illustration of a third embodiment which differs from the second embodiment in that the axial forces, which exist during operation of the centrifugal separator, are transmitted from the spindle 3 to the frame 1 by means of a member 41 transmitting axial forces, which is provided between the spindle 3 and the rotor 17 or rotor shaft 18 of the drive motor 15, in the same way as in the first embodiment. The member 41 transmitting axial forces thus comprises an element 41 which extends through the coupling member 30. In such a way the axial forces existing during operation of the centrifugal separator may be transmitted from the spindle 3 via the member 41 transmitting axial forces to the rotor 17 or rotor shaft 18 of the drive motor 15, and from there to one of the first bearing 21 and the second bearing 22, preferable the second bearing 22 which then is configured to absorb axial forces and preferably also radial forces.

The invention is not limited to the embodiment discloses above but may varied and modified within the scope of the following claims.

What is claimed is:

1. A centrifugal separator for separating components of varying density included in a fluid, comprising:
   a non-rotatable frame;
   a rotatable spindle, extending along a longitudinal axis;
   a centrifuge rotor, which is mounted on the spindle and rotatable with the spindle and which comprises a rotor casing enclosing an inner separation space;
   an inlet, which is connected to the separation space for supply of the fluid;
   at least one outlet, which is connected to the separation space for discharge of a component separated during operation;
   an electrical drive motor, which comprises a stator and a rotor and is arranged to drive the spindle and thus the centrifugal rotor, wherein the rotor of the drive motor is supported by a first bearing and a second bearing for rotation about a center axis;
   a coupling member, which is provided between and connected to the rotor of the drive motor and the spindle for transmitting a rotary movement of the rotor of the drive motor to the spindle;
   a third bearing, which is provided in the frame and supports the spindle in such manner that it is radially elastically provided in relation to the frame for transmitting a first part of radial forces, existing during operation, between the spindle and the frame;
   the coupling member comprising a lamella coupling and is arranged to transmit a second part of the radial forces, which during operation exist between the spindle and the frame, to the frame via the rotor of the drive motor and at least one of the first bearing and the second bearing;
   the coupling member comprises a first coupling element, which is connected to the rotor of the drive motor, a second coupling element, which is connected to the spindle;
   wherein the lamella coupling has a flexible coupling disc provided between and in torque transmitting engagement with the first coupling element and the second coupling element;
   the flexible coupling disc of the coupling member has a flexibility of a magnitude to permit inclination of the spindle in relation to the center axis;
   an axial member extending between the spindle and the frame, the axial member being in axial force-transmitting engagement with the spindle and the frame, the axial member being configured to bypass said coupling member from being in the axial force-transmitting engagement; and
   the flexible coupling disc has a central opening extending entirely there through from a first outermost axial end of the flexible coupling disc to a second outermost axial end of the flexible coupling disc, the axial member extends through the central opening and axially away from the first outermost axial end and the second outermost axial end of the flexible coupling disc.

2. A centrifugal separator according to claim 1, wherein the coupling member is arranged to centre a lower end of the spindle.

3. A centrifugal separator according to claim 1, wherein the centrifugal separator is designed to permit transmission of axial forces, existing during operation, from the spindle to the frame in such way that the coupling member is released from the axial forces.

4. A centrifugal separator according to claim 1, wherein the axial forces are transmitted from the spindle to the frame also via at least one of the first bearing and the second bearing.

5. A centrifugal separator according to claim 1, wherein the axial member is in axial force-transmitting engagement with the rotor of the drive motor.

6. A centrifugal separator according to claim 1, wherein a connecting member is connected to the rotor of the drive motor and wherein the axial member is in force-transmitting engagement with the connecting member.

7. A centrifugal separator according to claim 1, wherein the axial member is arranged to permit an inclination between the spindle and the frame.

8. A centrifugal separator according to claim 1, wherein the axial member is manufactured in an elastic material.

9. A centrifugal separator according to claim 1, wherein the axial member has an elongated, rod-like shape.

10. A centrifugal separator according to claim 1, wherein the spindle and the rotor of the drive motor are provided axially after each other.

11. A centrifugal separator according to claim 1, wherein the spindle extends through the rotor of the drive motor.

12. A centrifugal separator according to claim 1, further comprising an elastic element disposed between the third bearing and the frame.

13. A centrifugal separator for separating components of varying density included in a fluid, comprising:
   a non-rotatable frame;
   a rotatable spindle, extending along a longitudinal axis;
   a centrifuge rotor, which is mounted on the spindle and rotatable with the spindle and which comprises a rotor casing enclosing an inner separation space;
   an inlet, which is connected to the separation space for supply of the fluid;
   at least one outlet, which is connected to the separation space for discharge of a component separated during operation;
   an electrical drive motor, which comprises a stator and a rotor and is arranged to drive the spindle and thus the centrifugal rotor, wherein the rotor of the drive motor is supported by a first bearing and a second bearing for rotation about a center axis;
   a coupling member, which is provided between and connected to the rotor of the drive motor and the spindle for transmitting a rotary movement of the rotor of the drive motor to the spindle;
   a third bearing, which is provided in the frame and supports the spindle in such manner that it is radially elastically provided in relation to the frame for transmitting a first part of radial forces, existing during operation, between the spindle and the frame;
   the coupling member comprising a lamella coupling and is arranged to transmit a second part of the radial forces, which during operation exist between the spindle and the frame, to the frame via the rotor of the drive motor and at least one of the first bearing and the second bearing;
   the coupling member comprises a first coupling element, which is connected to the rotor of the drive motor, a second coupling element, which is connected to the spindle;

wherein the lamella coupling has a flexible coupling disc provided between and in torque transmitting engagement with the first coupling element and the second coupling element;

the flexible coupling disc of the coupling member has a flexibility of a magnitude to permit inclination of the spindle in relation to the center axis;

the flexible coupling disc has a central opening extending entirely there through from a first outermost axial end of the flexible coupling disc to a second outermost axial end of the flexible coupling disc; and the spindle extends through the rotor of the drive motor and through the central opening.

\* \* \* \* \*